United States Patent [19]

Baumann et al.

[11] 4,256,949
[45] Mar. 17, 1981

[54] METHOD AND WIRE FOR SUBMERGED ARC WELDING OF PIPE

[75] Inventors: Stephen F. Baumann, Ashtabula; Masahiro Nakabayashi, Jefferson; Gerald D. Uttrachi, Ashtabula, all of Ohio; Thomas L. Coless, Lewiston; Ernest N. Levine, Englewood, both of N.J.

[73] Assignee: Union Carbide Corporation, New York, N.Y.

[21] Appl. No.: 24,322

[22] Filed: Mar. 27, 1979

Related U.S. Application Data

[62] Division of Ser. No. 778,620, Mar. 17, 1977, abandoned.

[51] Int. Cl.³ .............................................. B23K 35/362
[52] U.S. Cl. ........................ 219/146.24; 219/73.2; 219/73.21
[58] Field of Search .................... 219/73, 73.2, 73.21, 219/146.24

[56] References Cited

U.S. PATENT DOCUMENTS

| | | | |
|---|---|---|---|
| 1,452,781 | 4/1923 | Becket | 75/123 N |
| 1,595,143 | 8/1926 | Doan | 75/123 N |
| 1,762,482 | 6/1930 | Miller | 75/123 N |
| 1,911,053 | 5/1933 | Brophy | 75/123 N |
| 3,227,350 | 1/1966 | Thielsch | 219/61 X |
| 3,227,849 | 1/1966 | Thielsch | 219/61 |
| 3,458,685 | 7/1969 | Tezuka | 219/146.24 |
| 3,745,294 | 7/1973 | Arikawa | 219/73 R |
| 4,029,934 | 6/1977 | Clark | 219/146.24 |
| 4,058,700 | 11/1977 | Ito | 219/73 R X |

Primary Examiner—Richard R. Kucia
Attorney, Agent, or Firm—Eugene Lieberstein

[57] ABSTRACT

A combination of welding wire and welding flux for submerged arc welding of high strength low alloy pipe which require low temperature impact properties of at least 30 ft./lb. at −13° F. The wire consists essentially of 2.0 to 3.5 wt. % manganese; 0.01 wt. % to 1.5 wt. % silicon; 0.05 to 0.15 wt. % carbon; balance iron with the proviso that when manganese is greater than 2.5 up to 3.5 wt. % the silicon content is between 0.01 wt. % to 1.5 wt. % and when the manganese content is between 2.0 to 2.5 wt. % the silicon content is greater than 0.3 wt. % up to 1.5 wt. %. The flux used with these wires is preferably acidic in nature.

7 Claims, No Drawings

METHOD AND WIRE FOR SUBMERGED ARC WELDING OF PIPE

This application is a division of our prior U.S. application Ser. No. 778,620 filed Mar. 17, 1977 now abandoned.

This invention relates to a wire and welding flux combination for submerged arc welding of high strength low-alloy steels of the type generally used for making pipelines for the transmission of gases. More particularly, this invention relates to a wire particularly suited for use with acidic type submerged arc welding fluxes for the welding of such steels.

The welding of high strength low alloy steels such as used for overland transport of gas and oil has traditionally been done by the submerged arc process. Fused type acidic fluxes have been widely accepted in this application because of their good operability, by which is meant that the flux can be used at high welding speed (relative to other fluxes such as a basic flux) to produce smooth low defect welds without undercuts or humping of the weld metal along the weld joint. These fluxes were normally used with welding wires containing manganese with no silicon or low silicon content. Typical wires were those designated by the American Welding Society as EH-14 or EM-12K. The specification for such wires can be found in AWS A5.17-76 as published by the American Welding Society. The latest specification was published in 1976.

These combinations of fluxes and wires do not produce the required low temperature impact properties needed to meet current standards for welding high strength low-alloy pipe steels. Accordingly, the industry was constantly seeking solutions to this problem.

One solution was to use a titanium or titanium-boron alloy electrode which require basic fluxes. Basic fluxes have the shortcoming of being voltage sensitive and limit weld speed. Such wires require a narrow and critical range of acceptable titanium. Therefore, manufacturing techniques are stringent and difficult to maintain. Likewise, titanium-boron electrodes have a narrow range of both elements.

Another approach to obtain high toughness is to use alloys added to bonded welding flux compositions. In this flux the material cost is low and operability good, but the material produces micro-segregation of alloy along the surface of the weld bead. This micro-segregation produces extremely hard spots in the weld metal leading to stress corrosion cracking as more fully described in Welding Research Council (WRC) Bulletin 184/June 1973 entitled "Submerged-Arc-Weld Hardness and Cracking in Wet Sulfide Service" as authored by D. J. Kotecki and D. G. Howden.

Accordingly, it is an aspect of this invention to provide a unique welding wire and welding wire and flux combination for welding high strength low-alloy steels.

It now has been discovered that satisfactory impact properties can be obtained with good welding conditions by using a welding wire containing critical amounts of manganese and silicon with a welding flux which is preferably essentially acidic in nature.

Satisfactory welds have been made using welding wires of various manganese and silicon contents. It has been observed and concluded that there is a critical amount of manganese and silicon required in the welding wire. It has been determined that if the wire contains greater than 2.5 wt.% up to 3.5 wt.% manganese the silicon content can be between 0.01 wt.% to 1.5 wt.%. However, if the wire contains between 2.5 wt.% manganese to about 2.0 wt.% manganese then the silicon content must be greater than 0.3 wt.% up to 1.5 wt.%.

Other elements can be present such as Molybdenum (0.1–0.5%) and/or Vanadium (0.05–0.20%) or other commonly used elements up to their critical value, but these elements are not essential to the remarkable impact results obtained.

Typical wire compositions suitable from the practice of the invention are shown in Table I.

TABLE I

| Sample No. | (Weight Percent) | | | | | | |
|---|---|---|---|---|---|---|---|
| | C | Mn | Si | Mo | V | P | S |
| A | .10 | 2.27 | .35 | — | — | .011 | .005 |
| B | .091 | 2.52 | .37 | .50 | — | .013 | .004 |
| C | .099 | 3.03 | .31 | — | — | .010 | .004 |
| D | .098 | 3.03 | .34 | — | .10 | .010 | .004 |
| E | .10 | 2.48 | .61 | — | — | .013 | .004 |

Table II below shows the compositions of typical welding fluxes useful with the wires shown in Table I. Also Table II shows the International Institute of Welding formula for determining the acidity or basicity of the welding flux composition. It will be noted that the four compositions shown are all less than 1 in Basicity number and, therefore, are considered to be acidic in nature.

TABLE II

| | Flux | | | | |
|---|---|---|---|---|---|
| | 1 | 2 | 3 | 4 | 5 |
| MnO | 12.3 | 22.2 | — | 14.1 | 8.0 |
| SiO$_2$ | 40.1 | 34.3 | 39.9 | 39.4 | 27.6 |
| Al$_2$O$_3$ | 5.1 | 4.8 | 2.5 | 3.0 | 21.6 |
| CaO | 17.6 | 13.2 | 33.8 | 24.0 | 20.0 |
| CaF$_2$ | 4.6 | 4.7 | 11.3 | 9.2 | 9.0 |
| TiO$_2$ | 18.9 | 12.5 | 11.9 | 7.9 | 1.0 |
| BaO | — | 0.3 | — | 0.5 | — |
| FeO | 1.1 | 1.8 | 0.3 | 1.0 | 1.0 |
| ZrO$_2$ | — | — | — | — | — |
| MgO | — | 0.1 | — | 0.3 | 11.8 |
| Na$_2$O | — | — | — | — | — |
| Basicity | (0.6) | (0.6) | (0.96) | (0.9) | (1.1) |

$$B = \frac{CaO + MgO + BaO + CaF_2 + Na_2O + K_2O + \frac{1}{2}(MnO + FeO)}{SiO_2 + \frac{1}{2}(Al_2O_3 + TiO_2 + ZrO_2)}$$

From the foregoing data it has been determined that a suitable flux for the practice of this invention should be in the following range of chemical compositions.

| | | | |
|---|---|---|---|
| SiO$_2$ | 25 | — | 50% |
| CaF$_2$ | 2.5 | — | 18% |
| MnO | 0 | — | 20% |
| TiO$_2$ | 0 | — | 20% |
| Al$_2$O$_3$ | 1.0 | — | 25% |
| CaO | 10.0 | — | 35.00% |
| MgO | 0 | — | 20% |

Tests have been performed on a high strength low alloy steel of the following compositions:

| C | Mn | P | S | Si | Cu | Ni | Cr | Mo | Al | Cb |
|---|----|---|---|----|----|----|----|----|----|----|
| 0.11 | 1.27 | 0.006 | 0.005 | 0.26 | 0.10 | 0.07 | 0.09 | 0.29 | 0.017 | 0.038 |

In this test the wire compositions A through E shown in Table I were used with both flux compositions 1 and 3 shown in Table II using typical pipeline welding conditions of two wire tandem submerged arcs. At the inside wall of pipe, the lead wire carried 850 amps at 31 volts. The second wire carried 700 amps at 39 volts. Travel speed was 41 ipm. At the outside wall of pipe, the lead wire carried 1100 amp at 33 volts. The second wire carried 660 amp at 42 volts. Travel speed was 41 ipm. When wire A was used with flux 1 impact properties of 25 ft.-lbs. at −13° F. were obtained. Accordingly, it is necessary to use a flux such as 3 or 4 which have a higher basicity number when the wire has a manganese content near the lower limit of 2.0 wt.% manganese. When wire A was used with flux 3 which has a basicity number of 0.96 the impact properties were 45 ft./lbs. at −13° F. which is well above the minimum of 30 ft./lbs. required by all world-wide accepted weld codes.

When wire B was used with flux 1, impact properties of 50 ft./lbs. at −13° F. were obtained. When wire B was used with flux 3, impact properties of 45 ft./lbs. at −13° F. were obtained. When wire C was used with flux 1, impact properties of 55 ft./lbs. at −13° F. were obtained. When wire C was used with flux 3, impact properties of 80 ft./lbs. at −13° F. were obtained. When wire D was used with flux 1, impact properties of 45 ft./lbs. at −13° F. were obtained. When wire D was used with flux 3, impact properties of 80 ft./lbs. at −13° F. were obtained. When wire E was used with flux 1, impact properties of 42 ft./lbs. at −13° F. were obtained. When wire E was used with flux 3, impact properties of 90 ft./lbs. at −13° F. were obtained.

From the foregoing, it can be observed that the most preferred combination of wire and flux is wire E with flux 3.

It will be obvious from the foregoing that the wire and flux combination of this invention has the following advantages over the prior art.

1. Charpy impact value is extremely good without adversary effect such as "hard spot" in the weld metal.
2. The chemical composition of the electrode does not contain critical elements such as Ti, B, Ni, etc.
3. High speed welding can be done with this flux-electrode combination.
4. The welding operability is excellent.
5. The combination of good operability, and lack of micro-segregation along with outstanding impact properties is unique in pipe welding.

While the invention has been described with reference to certain preferred embodiments, certain modifications can be made without departing from the spirit and scope of this invention. For example, high impact values can be obtained with the wire of this invention when a more basic flux is used. However, presently available basic fluxes are not known to provide good weldability compared to acidic fluxes.

What is claimed is:

1. A wire for submerged arc welding of high strength low alloy pipeline steels used with a flux consisting essentially of 39.9 wt.% $SiO_2$; 2.5 wt.% $Al_2O_3$; 33.8 wt.% CaO; 11.3 wt.% $CaF_2$; 11.9 wt.% $TiO_2$ and 0.3 wt.% FeO; such wire consisting essentially of 0.10 wt.% C; 2.48 wt.% Mn; 0.61 wt.% Si; balance iron with the proviso that when manganese is greater than 2.5 up to 3.5 wt.% the silicon content is between 0.1 wt.% to 1.5 wt.% and when the manganese content is between 2.0 to 2.5 wt.% the silicon content is greater than 0.3 wt.% up to 1.5 wt.%.

2. A wire for submerged arc welding of high strength low alloy pipeline steels using a flux composition consisting essentially of: 25–50% $SiO_2$; 2.5–18% $CaF_2$; up to 20% MnO; up to 20% $TiO_2$; 1.0–25% $Al_2O_3$; 10.0–35% CaO and up to 20% MgO; said wire consisting essentially of about 2.0 to 3.5 wt.% manganese; 0.01 to 1.5. wt.% silicon; and 0.05 to 0.15 wt.% carbon; balance iron with the proviso that when manganese is greater than 2.5 up to 3.5 wt.% the silicon content is between 0.01 wt.% to 1.5 wt.% and when the manganese content is between 2.0 to 2.5 wt.% the silicon content is greater than 0.3 wt.% up to 1.5 wt.%.

3. A wire according to claim 2, for use with flux consisting essentially of 12.3 wt.% MnO; 40.1 wt.% $SiO_2$; 5.1 wt.% $Al_2O_3$; 17.6 wt.% CaO; 4.6 wt.% $CaF_2$; 18.9 wt.% $TiO_2$ and 1.1 wt.% FeO.

4. A wire according to claim 2 for use with flux consisting essentially of 22.2 wt.% MnO; 34.3 wt.% $SiO_2$; 4.8 wt.% $Al_2O_3$; 13.2 wt.% CaO; 4.7 wt.% $CaF_2$; 12.5 wt.% $TiO_2$; 0.3 wt.% BaO; 1.8 wt.% FeO and 0.1 wt.% MgO.

5. A wire according to claim 2 for use with flux consisting essentially of 39.9 wt.% $SiO_2$; 2.5 wt.% $Al_2O_3$; 33.8 wt.% CaO; 11.3 wt.% $CaF_2$; 11.9 wt.% $TiO_2$ and 0.3 wt.% FeO.

6. A wire according to claim 2 for use with flux consisting essentially of 14.1 wt.% MnO; 39.4 wt.% $SiO_2$; 3.0 wt.% $Al_2O_3$; 24.0 wt.% CaO; 9.2 wt.% $CaF_2$; 7.9 wt.% $TiO_2$; 0.5 wt.% BaO; 1.0 wt.% FeO and 0.3 wt.% MgO.

7. A method for submerged arc welding high strength low alloy pipeline steels comprising depositing a flux having a broad range of 25–50% $SiO_2$; 2.5–18% $CaF_2$; up to 20% MnO; up to 20% $TiO_2$; 1.0–25% $Al_2O_3$; 10.0–35.00% CaO and up to 20% MgO, and then introducing a wire connected in tandem, each wire having a composition consisting essentially of 2.0 to 3.5 wt.% manganese; 0.01 wt.% to 1.0 wt.% silicon; 0.05 to 0.15 wt.% carbon; balance iron with the proviso that when manganese is greater than 2.5 up to 3.5 wt.% the silicon content is between 0.01 wt.% to 1.0 wt.% and when the manganese content is between 2.0 to 2.5 wt.% the silicon content is greater than 0.3 wt.% up to 1.0 wt.%; through the flux into contact with the pipeline steels to initiate the submerged arc, and then providing relative motion between the wires and pipeline steels to make a weld metal deposit having impact properties of at least 30 ft./lbs. at −13° F.

* * * * *